United States Patent [19]

Peterson

[11] 4,032,442
[45] June 28, 1977

[54] BY-PASS AND SYNCHRONIZED BLOW SYSTEM AND METHOD FOR ROTARY VACUUM FILTERS

[75] Inventor: C. Lynn Peterson, Salt Lake City, Utah

[73] Assignee: Peterson Filters and Engineering Company, Salt Lake City, Utah

[22] Filed: Nov. 21, 1975

[21] Appl. No.: 633,966

[52] U.S. Cl. .................................. 210/82; 210/108; 210/130; 210/278; 210/333 R; 210/393; 210/408; 210/411; 210/416 R; 210/425

[51] Int. Cl.² ........................................ B01D 23/24

[58] Field of Search ............. 210/77, 82, 107, 108, 210/392, 393, 408, 411, 416 R, 425, 427, 398, 327, 275–279, 130–136, 332–334, 410; 415/119; 137/609

[56] References Cited

UNITED STATES PATENTS

| | | | |
|---|---|---|---|
| 2,352,304 | 6/1944 | Young | 210/77 |
| 2,624,364 | 1/1953 | Detlefsen | 137/609 |
| 2,720,315 | 10/1955 | Peterson | 210/393 |
| 2,851,161 | 9/1958 | Dahlstrom et al. | 210/77 |
| 3,015,397 | 1/1962 | Schwartz | 210/395 |
| 3,253,712 | 5/1966 | Posgate | 210/108 |
| 3,397,784 | 8/1968 | Carr | 210/108 |
| 3,409,134 | 11/1968 | Wallace et al. | 210/327 |
| 3,459,275 | 8/1969 | Prillwitz et al. | 415/119 |
| 3,485,378 | 12/1969 | Regel | 210/393 |
| 3,513,981 | 5/1970 | Mendelow | 210/425 |

*Primary Examiner*—Frank W. Lutter
*Assistant Examiner*—Frank Sever
*Attorney, Agent, or Firm*—Bruce G. Klaas

[57] ABSTRACT

A method and system for use with rotary vacuum filters having a plurality of circumferentially spaced filter segments, for selectively applying blower air to the filter segments at predetermined rotational positions at which relatively unrestricted openings to the valve ports are provided to thereby blow the filter segments, and for bypassing the stream of blower air to the atmosphere when the filter segments are not blown. The apparatus for practicing the invention may also include a blow-back trap for trapping excessive amounts of residual blow-back filtrate during blowing of the filter segments.

23 Claims, 9 Drawing Figures

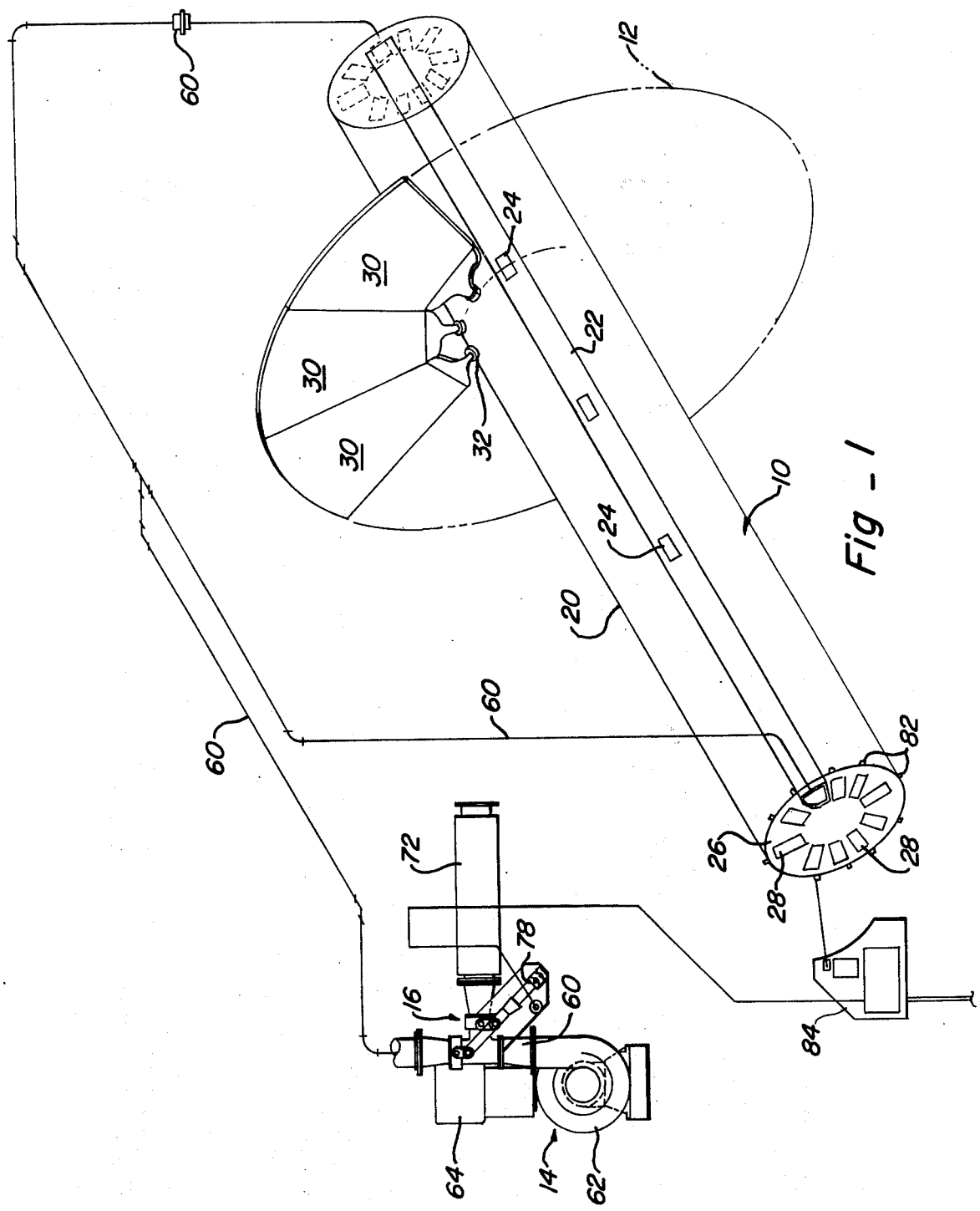

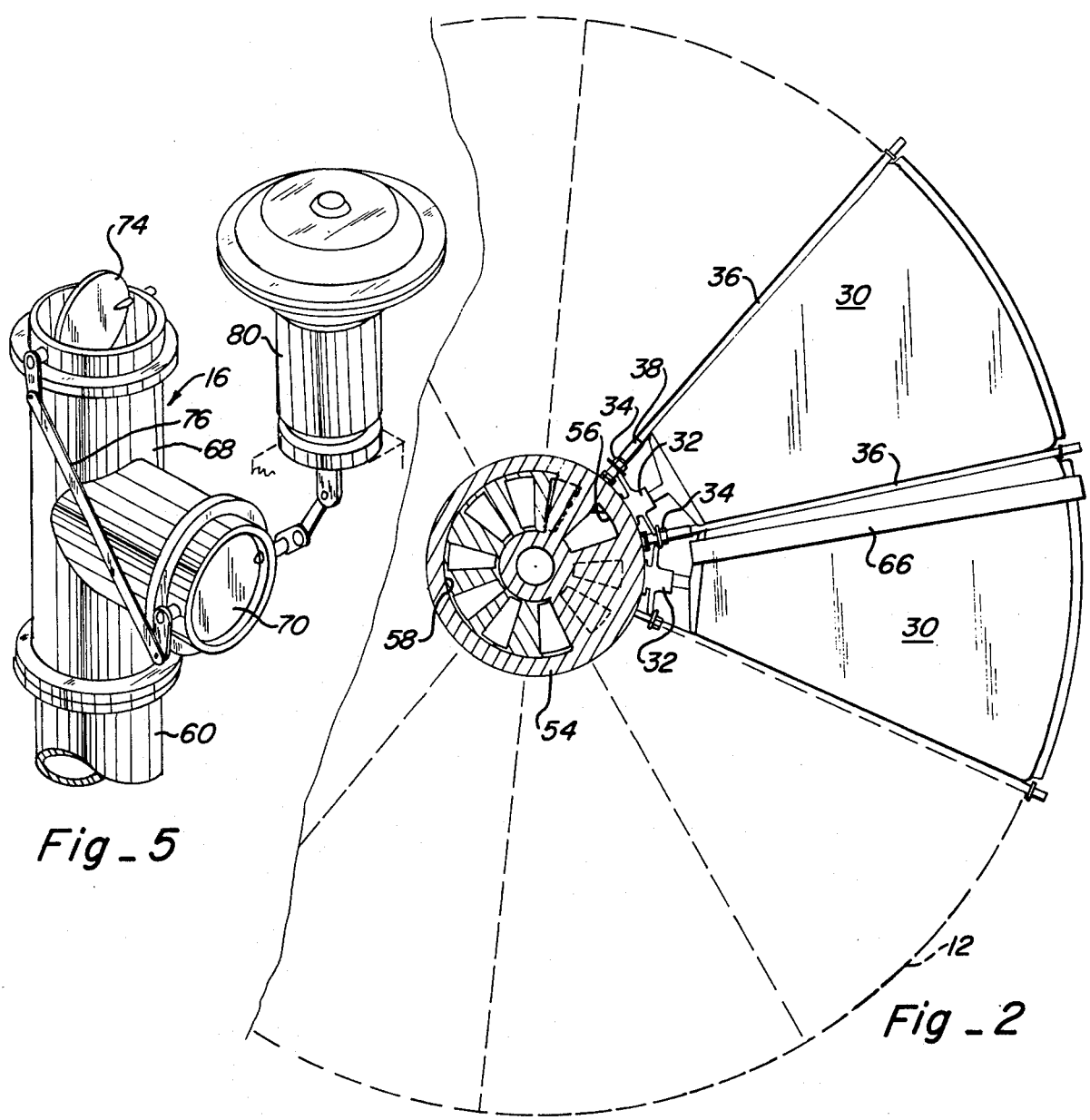
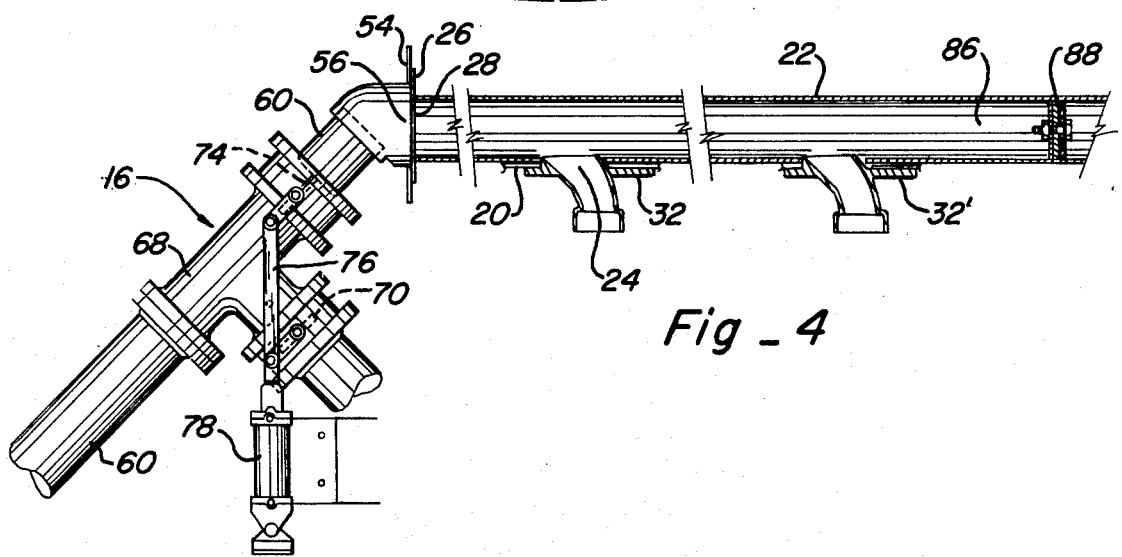

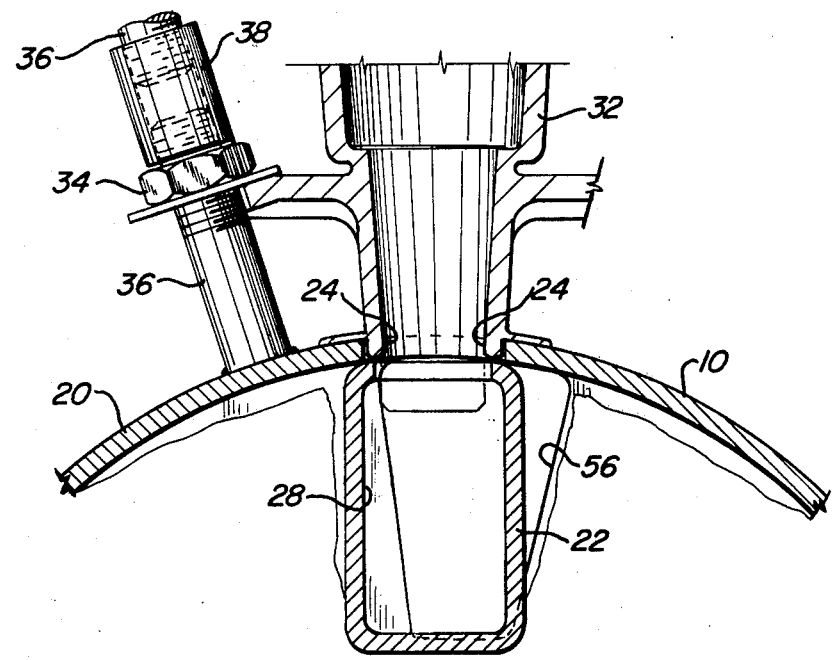
Fig_3
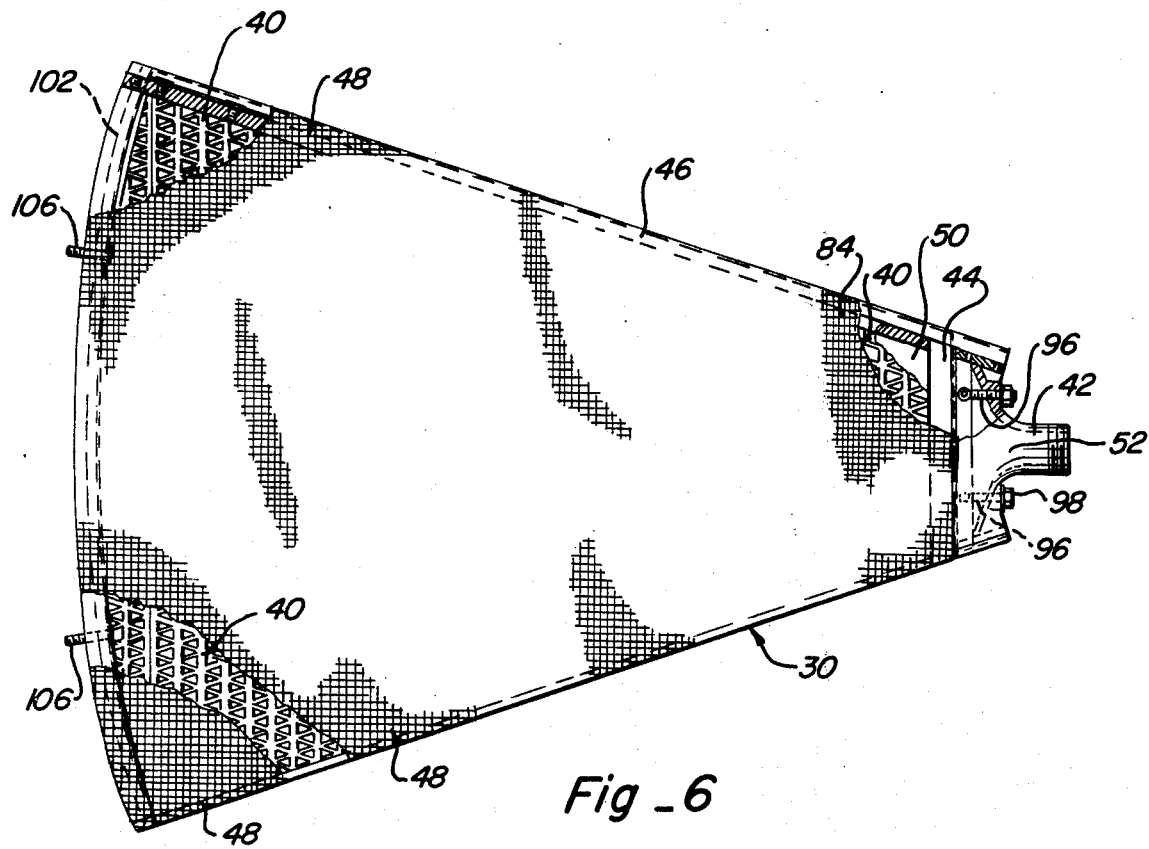
Fig_6

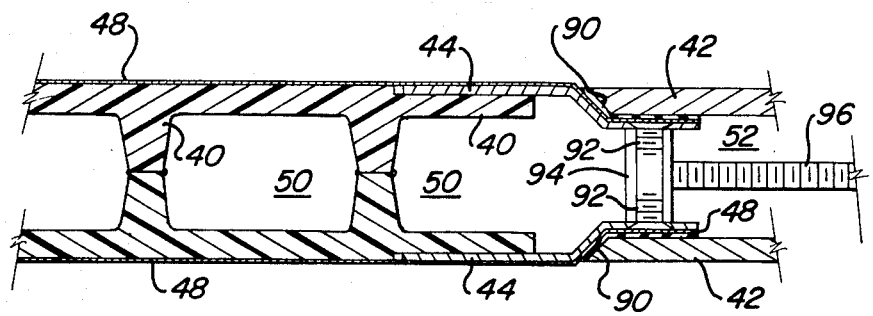
Fig _ 7
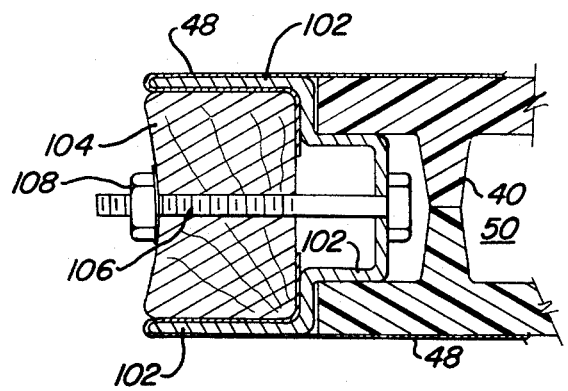
Fig _ 8
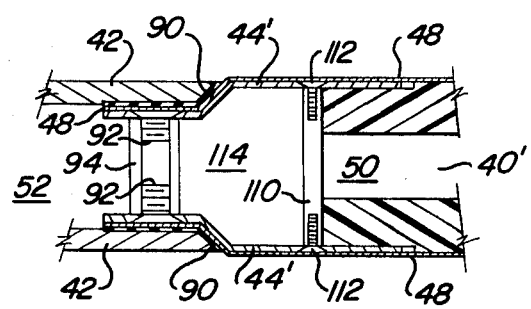
Fig _ 9

BY-PASS AND SYNCHRONIZED BLOW SYSTEM AND METHOD FOR ROTARY VACUUM FILTERS

BACKGROUND AND SUMMARY OF THE INVENTION

This invention relates to rotary vacuum filters and more particularly to a system and method for more effectively causing a pressurization or blow to discharge a cake of solid particulates accumulated during a continuous filtering process. Rotary vacuum filters of the disc-type or drum-type are useful in a wide variety of applications, especially in continuous filtering situations where large quantities of filtrates and particulate materials must be separated. Examples of such uses are in sugar processing and paper making. An application which is of considerable importance is the removal of coal from a coal-water slurry after the coal has been transported over extended distances through a pipeline or in coal preparation plants.

While certain of the inventive concepts are applicable to both disc-type and drum-type rotary vacuum filter systems, the inventive concepts are illustratively disclosed herein in a disc-type system. Rotary vacuum filters typically involve a number of filter segments arranged to extend from a central shaft or core member. In disc-type rotary vacuum filters, a number of axially spaced disc means are provided, and each disc means is formed by a number of filter segments extending radially outward from the core somewhat like sectors. Communication channels are established through the core which connect to certain groups of filter segments in the disc or drum structure. The core member is adapted to be rotably supported in a horizontal position slightly above a bath of liquids and particulate solids or a slurry. Rotation of the core with its attached filter segment structure causes each of the filter segments to be successively submerged in a slurry for somewhat less than one-half of a revolution.

As the filter segments are rotated into the slurry, the communication passage connecting those filter segments is opened to a source of vacuum. The vacuum attracts the particulates to the outside filter media of each filter segment with the filtrate moves through the filter media and into the filter segments and communication channels. The particulates of the slurry held on the filter media of the filter segment by the vacuum results in an accumulation of a cake or layer of particulates. The filtrate is removed from the communication channels and collected. In this manner, the filtrate is separated from the solid particulates, and either the separated filtrate or the solid particulates may be used in a desired situation.

The cake adheres to the filter segments after they rotate out of the slurry and after the vacuum has been removed because of surface tension forces of the cake interlocking with the filter media. This cake then must be removed before the filter segments again introduced into the slurry during the succeeding revolution by provision of removal means such as a scraper mounted stationarily and closely adjacent to contact the cake on the filter segment structure at a desired point during rotation. To further facilitate removal and discharge, a source of compressed air is connected to the communication passage to pressurized or blow each filter segment which is about to or is undergoing scraping. The blow returns a small amount of residual filtrate to the filter media to wet it which causes a loosening or breaking of the surface tension forces that cause the cake to adhere to the filter media of each filter segment. Prior art blow systems have been relatively slow in operation and have not adequately loosened the cake, particularly when the filter media of the filter segment is very porous or open and when the residual materials of the cake are wet and pliable.

The slowness of prior art blow systems is a result of the manner of application of the compressed air to the filter segments. In the usual prior art arrangement, one or both ends of the core of the rotary vacuum filter are terminated with valve ports opening to the communication passages to the filter segments. A stationary valve bridge plate is located adjacent the valve ports of the rotating core, and vacuum and blow parts are located at selected positions in the stationary valve bridge plate to provide vacuum or pressure to the valve ports at selected positions of rotation of the core. As the core rotates, the prior art valve ports of the core are slowly and gradually exposed or opened to the stationary vacuum and blow parts of the bridge plate thereby causing gradual application of pressure or vacuum at those filter segments whose communication passages are connected through the gradually opening valve ports. The slow and gradual opening of of the valve ports between the core and the stationary bridge plate results because of the slow rotation of the core, since it may take up to ten seconds for a port to open fully. During the period of this slow opening, there is a considerable energy loss due to a velocity head loss as the compressed air flows through the gradually opening valve ports to effect the flow. This velocity head loss requires that the air pressume source or pump provide higher than necessary pressure so that sufficient energy to blow the filter segments remains after the velocity head loss dissipation.

Increased pressure and volume necessary to overcome the velocity head loss has required the use of larger and more powerful motors for the pressure pumps to provide the increased energy. The motor driving the pressure pump operates continuously to supply air to the filter and, when a maximum pressure is reached prior to the blow, a relief valve connected to the pump opens to prevent any further pressure increase. This causes an oscillatory operation of the motor under cyclically fluctuating and recurring heavy loads to build up the pressure between successive blows. This cyclic operation has required relatively large motors which can withstand such operation without overheating and destruction.

A disadvantage of the slow blow type of prior art system utilizing a lobe type blower has been that it is difficult to make such a system conform to the noise standards as are currently applicable for the safety of workers under the Occupational Safety and Health Act. The cyclic operation of the motor and the operation of the air pressure pump driven by the motor may sometimes occur at natural harmonic frequencies of the structure surrounding the rotary vacuum filter causing a dramatic amplification of the noise levels at that harmonic frequency, particularly when lobed or Roots-type pressure pumps are employed. In addition, the pressure relief valve repeatedly opening to allow the escape of air causes surges of air with attendant increases in the noise level.

Prior art suggestions and attempts to solve the noise problem with slow blow systems, have included the substitution of slower and quieter running centrifugal blowers for the usual lobed ar pressure pumps. Such substitution is generally unsatisfactory. The cyclic accumulation of pressure and its release by the relief valve causes centrifugal blowers to surge, and surging causes accelerated wearing of the mechanical parts and consequent reduced lifetime and increases susceptibility to failure. When slower running lobe blowers are employed, larger and more costly motors must be used. Furthermore, such substitution does not eliminate the nose from the pressure relief valve.

Another significant disadvantage of slow blow systems is that they are not always effective in loosening or dislodging the cake over the total surface of the filter media of each filter segment. The slow opening of the valve ports cause the filter segments to be pressurized slowly, and this slow application of pressure tends to remove or loosen the cake on the filter media of the filter segments only at small portions of the filter media. After this partial loosening or dislodgment occurs, a largely unrestricted opening through the filter media to the atmosphere is opened for the increasing air stream of the pressurized air, which conducts the air stream from the filter segment. Thus, the intended total loosening that would occur if the filter segment could be pressurized more quickly does not occur. It is desirable to loosen or dislodge the whole cake approximately simultaneously before it encounters the scraper to facilitate a better removal, but due to the slow opening of the valve ports in slow blow systems, the desired performance is not achieved.

Snap blow systems, also known in the art, involve very high pressure and low volume sources of air, and are used with filters having very fine filter media such as cloth bags. Snap blow systems involve expensive high pressure pumps, accumulator tanks and pressure relief valves and employ an arrangement of control valves to delay the application of the pressure to the filter segments until the valve ports have achieved a full opening. However, snap blow systems are not of a nature that can be used with porous or coarse filter media such as wire mesh because the filter media must be very fine to provide the requisite resistance to the high pressure so that the whole filter segment can be pressurized very quickly. The fine filter media only allows snap blow systems to be used in certain applications, for example, to remove copper or iron, and the applications are generally effective only when the cake discharge is dry and brittle. If the cake discharge is somewhat moist and pliable, as in the case of coal taken from a slurry, snap blow is not greatly effective. With a fine filter media, it may be difficult to obtain a high volume of cake discharge as in the case of removing coal from a slurry at a coal preparation plant where, for example, 40 to 50 pounds of coal must be removed each hour from each square foot of filter media of the filter segments.

A problem which may be encountered with low pressure, high-volume air blow systems is an undesirable amount of blow-back of residual filtrate during the blow. Although some blow-back of residual filtrate particles is effective in loosening the cake through reduction of surface tension of the interlocking surface of the cake with the filter media, too much blow back so sufficiently wets the cake that the separated particulates of the cake contain an undesireably high content of filtrate. This, of course, reduces the effectiveness of the separation process and is to be avoided.

Accordingly, it is a general object of this invention to provide a blow system and method for rotary vacuum filters which avoid the foregoing disadvantage of the prior art and allow the effective use of rotary vacuum filters in applications which have heretofore not provided largely successful.

It is an object of this invention to provide a bypass and synchronized blow system and method which avoid energy dissipation inherent in the velocity head losses resulting from the slow opening of the valve ports.

It is another object of this invention to provide a bypass and synchronized blow system and method which quickly and effectively pressurize the filter segments.

It is another object of this invention to provide a bypass and synchronized blow system and method which effectively distribute the air pressure throughout the whole surface of relatively porous filter media of the filter segments.

It is still another object of this invention to provide a bypass and synchronized blow system and method which cause a uniform and mearly simultaneous loosening or discharge of the accumulated cake.

Another object of the invention is to provide a bypass and synchronized blow system and method which more effectively loosen and dislodge the whole cake accumulated, to thereby secure a more effective performance of low-pressure high-volume blow systems for rotary vacuum filters.

This invention of a bypass and synchronized blow system and method involves another of its objectives the reduction of noise during the blow of rotary vacuum filters.

Another objective of this present invention is to provide means associated with a rotary vacuum filter for eliminating the undesirable effects associated with excessive blow-back of filtrate during the blow.

To achieve these and other advantages and objectives, the present invention involves an airstream control means, which may include a bypass apparatus, in conjunction with a synchronizing apparatus for connecting blower air to the filter segments only when the valve ports through which the airstream must pass have rotated into a relatively unrestricted opening with a blow port in a stationary bridge plate. A bypass means is provided for directly connecting the pressurized air obtained for a continuously operable pump or blower to the atmosphere when a blow is not required. The synchronizing apparatus is operative in conjunction with the bypass means to conduct the airstream through the ports only when there is a relatively unrestricted opening therethrough, at which time a bypass valve is operable to simultaneously and rapidly terminate the discharge of the airstream from the pump to the atmosphere and, instead, direct it through the unrestricted opening of the ports into the communication channels to the filter segments, thus avoiding velocity head losses. A trap or pocket is provided in the communication passages to eliminate undesirable amounts of filtrate which could be blown back during the blow.

A more complete understanding of the present invention may be had by a reference to the following detailed description of the invention and the brief description of the drawings in which:

BRIEF DESCRIPTION OF THE DRAWINGS

FIG. 1 is a partial schematic and perspective view of a presently preferred and illustrative embodiment of a disc-type rotary vacuum filter by which the present invention may be described;

FIG. 2 is a partial side elevational view, partly in cross-section, of a central core member and filter segments of the rotary vacuum filter depicted in FIG. 1;

FIG. 3 is an enlarged partial side elevational view in cross section of communication passage means associated with the rotary vacuum filter depicted in the Figures;

FIG. 4 is a schematic illustrative partial side elevational view, partly in cross-section, of a center core member and communication passage means of a rotary vacuum filter as generally depicted in the FIGS. 1-3;

FIG. 5 is a perspective view of one embodiment of a bypass and blocking means associated with the rotary vacuum filter as depicted in FIGS. 1-4;

FIG. 6 is a side elevational view of one form of a filter segment of the rotary vacuum filter depicted in FIGS. 1-5; and FIGS. 7, is enlarged partial cross-sectional views of portions of a filter segments of the type shown in FIG. 6; FIG. 8 is also an enlarged partial cross-sectional view of portions of a filter segment. FIG. 9 is also an enlarged partial cross-sectional view of portions of a filter segment.

DETAILED DESCRIPTION OF THE INVENTION

The present invention will be discussed in conjunction with a disc type rotary vacuum filter, although it should be understood that the invention may be used in conjunction with rotary vacuum filters including drum type rotary vacuum filters.

Referring now to FIG. 1, an illustrative and presently preferred system of the present invention is shown in conjunction with an illustrative disc type rotary vacuum filter, and it comprises a central core member 10, a plurality of axially spaced and radially extending filter disc means 12 (one of which is illustrated), a source of blower air 14, and an airstream control means 16. The filter further includes other conventional rotary filter apparatus (not shown) such as a slurry tank through which the filter means are rotated, bearing apparatus for rotatably supporting the central core member 10, a motor for causing rotation of the central core member, a source of vacuum selectively connectable to the filter means, and cake removal apparatus associated with the filter disc means.

The central core member 10 comprises a hollow annular shaft member 20 having a plurality of circumferentially spaced flow passages or communication channels 22 (one of which is illustrated). The communication channels 22 are located radially adjacent the outer periphery of the shaft member 20 and extend axially from end to end of the shaft member. Each of the communication channels is provided with a plurality of axially spaced radially outwardly extending flow openings 24 for connecting the communication channels to the filter disc means 12.

Each of the filter disc means 12 comprises a plurality of individual filter disc segments 30 fixedly mounted in juxtaposition about the shaft member 20 for rotation with the central core member. Each filter disc segment 30 of each of the filter disc means 12 is connected to a different one of the communication channels 22 through one of the flow openings 24 by a connecting member 32, such as is described more fully in U.S. Pat. No. 3,659,716, and assigned to the assignee of the present invention. The arrangement is such that each communication channel 22 is connected to one filter disc segment 30 of each of the filter disc means 12 with the filter disc segments connected to the same communication channel being axially aligned and occupying corresponding radial orientations in all of the filter disc means.

Also shown in FIGS. 2 and 3, each connecting member 32 is retained in position over the flow opening 24 by contact with a nut retaining means 34 on a threaded rod 36 extending from the shaft member 20. A coupling 38 is provided for extending the threaded rod 36 to the radial periphery of the filter disc means 12 where a retaining means similar to that retaining means at 34 is used to firmly attach each of the filter segments 30 to the central core member 10. In this manner, a plurality of filter disc segments 30 are retained in juxtaposition in a disc like arrangement to form the filter disc means 12 axially spaced along the central core member 10.

A filter disc segment 30, also shown in FIGS. 6-9, may be comprised of an internal supporting body member 40, a sector bell member 42 attached to the supporting body 40 by a clamp 44, an outside frame 46, and a filter media 48, which may be, for example, 60 × 40 wire mesh stretched over the internal supporting body 40. The internal supporting body member 40 and the sector bell member 42 have open internal passageways 50 and 52, respectively, so that communication with the openings or interstices of the filter media 48 are achieved in each filter segment 30. Fluid passing in either direction through the connecting member 32 is introduced into or received from the filter segment 30 through the sector bell member 42. A more complete description of one form of a filter segment may be found in U.S. Pat. No. 3,485,378 assigned to the assignee of the present invention.

Referring now to FIGS. 1 and 2, a face plate 26 having ports 28 corresponding to the open ends of channels 22 is removably fixedly mounted on each end of the core member 10 and rotatable therewith. As shown in FIG. 2, a stationary bridge plate 54 having a relatively small blow port 56 generally corresponding in size and shape to ports 28 and a circumferentially elongated relatively large vacuum port 58 is fixedly mounted on a valve head member (not shown) as illustrated in U.S. Pat. No. 3,659,716, which has a blow chamber connected to the blow port 56 and a vacuum chamber connected to the vacuum port 58. Thus, as the core member 10 and the face plate 26 rotate relative to the fixedly mounted bridge plate 54 and valve head, the blow part 56 and the vacuum port 58 are sequentially aligned with various ones of the face plate ports 28 and channels 22 to selectively alternately connect the channels 22 to the air source and the vacuum source. Also shown in FIG. 1, an air duct 60 connects the blow port 56 with the source of blower air 14. The airstream control means 16 may be located in the air duct 60. A stream of pressurized air from the source of blower air 14 is delivered to the air duct 60 to the blow part 56 in the stationary bridge plate 54 to cause a blow or pressurization of the filter segments 30 under conditions to be explained more fully subsequently.

The source of blower air 14 may be comprised of a centrifugal blower 62 rotated by an electric motor (not shown). The output of the source of blower air is an airstream having a pressure greater than that of the ambient atmospheric pressure. This airstream is directed through the air duct 60 to the airstream control means 16. Alternatively, a lobed type pump may be substituted for the centrifugal blower 62, but lobed type pumps are typically noisier in operation. A silencer 64 may be provided at the air inlet to the air source 14 to further silence the operation of the apparatus if desired.

The airstream control means 16 comprises a significant portion of the present invention. For the purposes of the present general and illustrative description of operation only, the airstream control means 16 provides an open passageway through the air duct 60 in one operative condition to allow the stream of compressed air from the source 14 to flow to the blow ports 56, and in another operative condition, provides a passageway to the atmosphere for the stream of blower air. A more complete description of the airstream control means will follow.

Describing the general operation of a disc-type rotary vacuum filter, the various valve ports 28 of the general core member 10 rotate into open adjacency with the vacuum ports 56 of the stationary bridge plate 54, and the filter segments connected to the particular communication channel 22 are exposed to a source of vacuum. This exposure occurs at a rotational position at which the axially aligned filter segments along that particular communication channel have been sumerged in the slurry or bath beneath the central core member 10. The source of vacuum sucks filtrate from the slurry and causes the filtrate to pass through the interstices of the filter media 48, through the communication channels 22, through the valve ports 28 and vacuum port 58 where the filtrate is further passed to a suitable receptacle known in the art for receiving a filtrate. The residual particulate matter of the slurry, not being a part of the filtrate, collects on the filter media 48 of the filter segment 30 and thereby forms a cake or layer of accumulated particulate matter. The vacuum to the filter segment is maintained by the vacuum port 58 as the filter segments rotate through the slurry and out of the slurry on the opposite side. The continued application of the vacuum after the filter segments have emerged from the slurry has a tendency to cause the surface of the cake adjacent to the filter media to dry out and cause surface tension resulting in adherence of the cake to the filter media. After the filter segments have rotated out of the slurry bath, some, but not all, of the residual filtrate inside the filter segments and communication channels is swept out.

The cake of accumulated particulate material on the filter media must be removed or discharged before the filter segment is again introduced into the slurry bath in the next revolution. It is the purpose of the blow of the filter segments to facilitate removal of the cake. The pressurization during the blow tends to break the surface tension of the residual cake on the filter media by blowing back an amount of residual filtrate which wets the interface between the filter media and the cake to destroy the surface tension or capillary action of the cake on the filter media. The flow is totally effective to loosen the cake to enable the cake to be discharged and fall from the exterior of the filter segment by use of a scraper-deflector means 66 in the form of a blade 66, shown in FIG. 2, mounted in closely spaced relationship to the filter media surface at the exterior of the filter segments for deflecting or dislodging the cake which has been loosened during the blow. One scraper 66 is mounted on each side of each filter disc means 12 so as to contact the filter media on both sides of the filter segments.

A signficant aspect of the present invention for a new and improved method and system for effecting the blow of the filter segments of a rotary vacuum filter is the airstream control means 16, shown in FIGS. 1, 4, and 5, and being comprised in one fully described embodiment as follows.

A branched connection 68 such as a T-shaped fitting may be inserted in the air duct 60, and generally the air duct directly connects the source of blower air 14 to the blow port 56 of the stationary bridge plate 54 adjacent the rotating central core member 10, the direct connection meaning the elimination of the accumulator tank and the pressure relief valve as is typical in the prior art. Located in the air duct, e.g., in the branched connection 68, is a bypass means 70 or a first valve such as a butterfly valve. If the bypass means 70 is closed, defining a first operative condition, a closed passage for the airstream from the source of blower air 14 through the air duct 60 is provided to the blow port 56. When the bypass means 70 is open, defining a second operative condition, an open passage is provided for the airstream in the air duct 60 to the atmosphere. As is shown in FIG. 1, it may be advantageous to achieve noise reduction, if desired, to connect a silencer 72 in the airstream path with the bypass means so that the air conducted through the open bypass means 70 also flows through the silencer 72 to the atmosphere.

The airstream control means may also include a blocking means 74 or second valve, such as a butterfly valve, located in the branched connection 68 in series with the blow port 56 downstream of the bypass means 70. A linkage 76 connects elements 70 and 74 and determines the rotational positions of the bypass means 70 and the blocking means 74 so that the blocking means is open in the first operative condition when the bypass means is closed in the first operative condition, and the blocking means is closed in the second operative condition when the bypass means is open in the second operative condition. When the elements 70 and 74 are in the first operative condition, the airstream is directly supplied from the air source 14 to the blow port 56. When the elements 70 and 74 are in the second operative condition, the airstream is bypassed from the air source 14 through the open bypass means 70 to the atmosphere, aided by closed blocking means 74.

Connected with the linkage 76 to cooperatively change the operative conditions of bypass means 70 and the blocking means 74 is an actuating means such as an air plunger device which may be a two-way or double acting air cylinder 78 as shown in FIGS. 1 and 4, or a diaphragm type actuator 80 shown in FIG. 4. Electrical actuators may also be employed if desired. The air cylinder 78 may be employed in a manner well known in the art with the retraction and extension of the piston of the air cylinder causing the bypass means 70 and blocking means 74 to achieve their first and second operative conditions, respectively. The diaphragm type actuator 80 of FIG. 4 may cause the bypass means 70 and the blocking means 74 to achieve one operative condition, and a spring (not shown) may return the elements 70 and 74 to the other operative position.

A synchronizing means used to provide a signal for causing the airstream control means 16 to operate according to the invention will next be described in conjunction with FIG. 1. The synchronizing means includes a trip mechanism or trip means which may be in the form of a plurality of timing pins 82 connected to the central member 10. The timing pins 82 or trip means are operatively connected to represent the rotational position of the valve ports 28 in the face plate 26. Other suitable trip mechanisms may be used so long as the trip mechanism is operative to represent the rotational position of at least one valve port in the central core member. A switch device 84 is mounted in a relationship with the timing pins 82 to cause a signal when activated by the timing pins of the trip mechanism during rotation of the core member. The switch device 84 may assume a wide variety of forms, including electrical or pneumatic. The signal from the switch device 84 is utilized to operate the actuating means, for example, the air cylinder 78 or diaphragm actuator 80. If an electrical switch 84 is used, the electrical signal can control air solenoid valves to actuate the double acting air cylinder 78 or the diaphragm actuator 80. Ultimately, the signal from the switch device 84 must be caused to be compatable with the actuator means. There may also be included a time delay means used in conjunction with the actuating means or switch device to cause reversion of the airstream control means 16 to the other operative condition a predetermined time after the switch device has been actuated by the trip-mechanism. The time delay means may be of a known mechanical or electrical configuration.

The synchronizing means including the trip mechanism and the switch device are arranged with the trip mechanism and switch device operative in relation to the opening between the blow port 56 and the valve ports 28 to deliver the signal causing the airstream control means to assume the first operative condition upon attainment of a relatively unrestricted opening between the blow port and the valve ports as a result of rotation of the central core member. An example of a relatively unrestricted opening is illustrated in FIG. 3. Due to the slow rotation of the central core member 10, for example, at 3 minutes per revolution, a relatively small and unrestricted opening between the blow port and the valve port may occur for a significant amount of time, possibly up to 10 seconds. The bypass means 70 is held open so that no significant airstream is delivered to the blow port until a relatively unrestricted opening such as that exemplified by FIG. 3 is obtained, at which time the synchronizing means operates which results in closing the bypass means. By this arrangement, the energy losses inherent as a result of a velocity head loss are avoided when a restricted or insufficiently large opening between the valve port and the blow port exists. The amount of opening necessary to define a relatively unrestricted opening between the blow port and the valve port may vary according to the application, and may be determined through actual use. The unrestricted opening will generally occur at some point after the initial opening of the passage between the blow port 56 and the valve port 28 and before the achievement of a maximally open passageway therebetween, and it should be understood that FIG. 3 is merely an exemplary representation of a relatively unrestricted opening. Accordingly, the operative position of the switch device 84 relative to the trip mechanism of the synchronizing means may be varied in accordance with specific applications to secure the desired performance.

After the relatively unrestricted opening has been achieved and a signal delivered by the synchronizing means for use by the actuating means to cause the airstream from the air source 14 to be directed to the blow port for blowing the filter segments, the time delay device may become operative a predetermined time after the blow has been initiated to cause the actuating means to return the bypass means 70 and the blocking means 74 to the second operative condition, thereby bypassing the airstream from the blow port. This time delay device may include the spring (not shown) in conjunction with the diaphragm actuator 80 of FIG. 5, or may include a timer used in conjunction with the switch device 84 for causing the double acting air cylinder 78 to attain the operative condition for bypassing the airstream from the blow port.

Another important aspect of the present invention involves the use of a blow back filtrate trap 86 as is best shown in FIG. 4. Residual filtrate remaining in the communication channels 22 after the application of the vacuum may be blown back into the filter segments 30, particularly with high volume airstreams. Excessive blow back of residual filtrate causes undesired amounts of filtrate to remix with the accumulated cake. Since the object of the filter process is to separate the particulates from the filtrate, excessive blow back reduces the effectiveness of the separation process. To solve the problem of excessive blow back of filtrate a trap or pocket 86 is provided by the location of a partition 88 at the effective end of the communication channel. The partition 88 may be in the form of a plate having gasket members on each side thereof which are resiliently expanded into frictional retaining engagement with the inner surfaces of the channel 22. The effective end or termination point of the communication channel should be displaced further down the communication channel from the valve port 28 than the furthermost displaced connecting member 32', in FIG. 4. The area in the communication channel between the end of the communication channel and the last connecting member 32' for the last filter segment forms a trap or pocket downstream of the last filter segment during the blow. The airstream during blow sweeps the excessive filtrate ahead of it and into the filtrate blow back trap 86 preventing an excessive amount of the filtrate blow back from passing into the filter segments and into the cake. The trapped filtrate is removed during the next rotation when the vacuum is applied.

The disc-type rotary vacuum filter illustrated in FIG. 1 is a double-valve type meaning the valve ports 28, blow ports 56, and vacuum ports 58 are provided at both ends of the central core member 10. In this double-valve arrangement, the partition 88 is provided in an intermediate position in each communication channel to cause the valve ports 28 at each end of the central core member 10 to communicate only with those filter segments between each valve port and the partition. The filtrate blow back trap 86 may also be incorporated in a single-valve rotary vacuum filter. A single-valve rotary vacuum filter has valve ports 28 in the face plate only at one end of the central core member 10 and the communication channels extend axially through the core member from the ported end to the closed end as is known in the art. In application of the filtrate blow back trap to single-valve rotary vacuum filters, the communication channel must extend past the last connecting member and last flow opening toward the closed end of the core member to provide the filtrate blow back pocket or trap of approximately the same nature as those 86 at the intermediate point of the communication channels of double-valve rotary vacuum filters. The partition 88 is not needed with single valve rotary vacuum filters since the closed end of the central core member may act as the partition.

It appears that the most desirable performance may be obtained with the present invention if the air source 14 is capable of supplying between 0.6 and 1.0 actual free air cubic feet per minute per square foot of filter area when 60×40 wire mesh filter media is employed. Of course, the best performance is obtained when the air source is capable of approaching 1.0 actual free air cubic foot per minute per square foot of filter area, but cake discharge performance significantly better than that obtained from a typical prior art slow blow system has been achieved at air volumes as low as 0.45 actual free air cubic feet per minute per square foot of filter area. The pressure of the blower air that these relatively high volumes need may be relatively low, for example 1.25 to 1.5 psig. Care should be taken when using these high volumes of air to avoid significant energy losses in the air ducts leading to the blow ports. For example, in the embodiment shown in FIG. 1, a considerable length of air duct is shown between the air source 14 and the blow ports, and the cross sectional area of the air ducts must be increased to compensate for losses inherent in such extended lengths at relatively high air volumes.

The high volumes of air are delivered to the filter segments very quickly by the present invention due to the relatively quick closure of the bypass means when a relatively unrestricted opening exists from the blow port to the valve port. The quick pressurization requires that the filter media 48 be securely sealed around each filter segment 30. If the seal is not adequate, air may escape through the unsealed areas and an ineffective blow of the filter segment may result. One point where a secure seal is particularly important is at that position where the sector bell member 42 joins the filter media of the filter segment, shown in FIGS. 6, 7 and 9. If a secure seal is not provided at this location, the air during the blow will escape above the sector bell member and may not adequately loosen the accumulated cake over the whole filter surface media particularly at the radially outward surfaces away from the sector bell member. An effective means for sealing this area above the sector bell member has been achieved by employing a squeeze-out cell-type gasket 90 held securely intermediate the sector bell member 42 by the clamp 44. Bolts 92, a sleeve 94 and the clamp 44 attached to the supporting body member 40 and are more fully described in U.S. Pat. No. 3,485,376. In addition, however, bolts 96 may be attached to the sleeve 94 to protrude radially outward of the sector bell member 42. Nuts 98 are threaded on the bolts 96 and cause the clamp 44 to be firmly pulled toward the sector bell member thereby wedging the gasket 90 into the sector bell member.

A means of securely sealing of the filter media to the radially outward curved portion of the filter segment is shown in FIG. 8. In this arrangement, a U-shaped member 102 serves as the outer frame 46 for the outer radially curved edge of the filter segment 30, and the filter media 48 is bent over and locked against the outward protruding portions of the U-shaped frame. A top piece 104 made of wood, for example, is driven in the opening of the U-shaped member 102 between the outward protruding portions to securely attach the filter media 48. Apertures in the piece 104 are provided to fit over threaded bolts 106 extending outwardly from the U-shaped member 102, and a nut 108 is threaded over the bolt 106 to securely hold the wood piece 104 in position and thereby secure a tight seal for the wire mesh 48.

The opening from the passageway 52 in the sector bell member 42 to the passageway 50 in the supporting body member 40 of the filter segment 30 should be as large as possible to increase the effectiveness of the air flowing through the sector bell member and into the interior of the filter segment during the blow. It has been found that the plastic supporting media as disclosed in U.S. Pat. No. 3,485,376 works very successfully with the present invention and provides adequate performance. It may be however, that known wooden supporting body member, if used in the filter segments with the present invention, may provide reduced performance due to a relatively restricted cross-sectional area available for the airstream from the sector bell member to enter the various grooves and channels in the wooden supporting body member. Improvements useful with the present invention for attaching wooden supporting body members to the sector bell member are illustrated in FIG. 9. The improvement of FIG. 9 employs many of the same elements are previously described in FIG. 7 and these elements are referenced by similar reference numerals. In addition, a radially longer clamp 44' and a secondary clamping device are used to firmly attach the clamp 44' to a wooden supporting body member 40'. The secondary clamping device may be comprised of a secondary sleeve 110 into which two secondary bolts 112 are threaded to securely attach the longer clamp 44' firmly to the wooden supporting body member 40'. By using the longer clamp 44', secondary sleeve 110 and secondary bolts 112, a larger volume 114 between the sector bell member 42 and the wooden supporting body member 40' is provided to increase the area through which air might be distributed to the grooves of the wooden supporting body member 40' for communication with the filter media 48. Although not shown in FIG. 9, bolts 96 attached to sleeve 94 may be used in the same manner as discussed in conjunction with FIG. 7.

The foregoing apparatus is one example of that which may be employed to practice another aspect to the present invention, a method of blowing the filter segments in a rotary vacuum filter. The method comprises the steps of switching the airstream provided by the air source 14 to the valve ports when a relatively unrestricted opening through the valve ports occurs, and bypassing that air flow to the atmosphere when not blowing the filter segments, both steps being accomplished by the airstream control means 16, if desired. Trapping the excessive amounts of blow back filtrate by the blow back traps 86 may also be effectively practiced and is particularly significant when a relatively high volume air source is used for blowing the filter segments. Maintaining the airstream through the valve ports to blow the filter segments for a predetermined time after the airstream is initially switched through the valve ports, controlled by the time delay means, achieves adequate air flow and pressure to promote an effective discharge of the accumulated cake. Because of the more effective discharge of the accumulated cake of particulate material, when practicing the invention it is advantageous to arrange the positions of the flow port 56 in the stationary bridge plate 54 relative to the rotating valve ports 28 in the face plate 26 of the central core member 10 so that the relatively unrestricted position at which the airstream is switched through the valve ports to the filter segments occurs immediately before the filter segments encounter the scraper 66, as can be best seen in FIG. 2. This arrangement provides substantially improved performance in securing effective cake discharge, because the cake is substantially completely loosened over the entire surface area of the filter segments, whereas in prior art systems there are often substantial variations in blow effect in different portions of the filter segment. Thus, with the present invention, the cake can be completely loosened so as to be deflected more easily by the scraper-deflector.

As is readily understood from the foregoing description, velocity head losses inherent in slow blow systems are avoided since the airstream is not conducted through the blow and valve ports to the filter segments until a relatively unrestricted opening occurs. This, of course, allows a quick and rapid blow of the filter segments, resulting in a more effective cake discharge than has heretofore been attainable with the slow blow systems, since the rapid blow of the present invention conducts residual filtrate over the whole surface of the cake interlocked with the filter media, thereby destroying the surface tension. Furthermore, the rapid pressurization of the filter segments due to the quick switching of the airstream through the relatively unrestricted opening causes a rapid pressurization of the whole filter segment, not just the area above the sector bell member as is typical with the prior art slow blow systems. This rapid pressurization promotes a nearly uniform discharge of the cake over the whole filter media of the filter segment, including that area radially outward from the sector bell member, a result typically not secured by the prior art slow blow systems. The blow back filtrate trap employed in one embodiment of the present invention prevents the remixture of excessive amounts of filtrate with the cake of accumulated particulates, and increases the effectiveness of the separation of the filtrate from the particulates by rotary vacuum filters. By bypassing the airstream to the atmosphere when the airstream is not used to blow the filter segments, the necessity, cost and noise associated with a pressure relief valve have been eliminated. The elimination of the pressure relief valve is important in reducing noise since the objectionable noise when the relief valve opened between each blow has been eliminated. Furthermore the fluctuation or oscillation of the load on the electric motor of the air source or blower is avoided since relatively constant or steady state load results whether bypassing the airstream to the atmosphere or blowing the filter segments. This relatively constant load avoids a surging condition and allows the advantageous use of centrifugal blowers which operate more quietly than the noiser lobe-type pumps. In addition, the motor may be a smaller and less costly since it may operate in a steady state condition near its maximum capacity; whereas, in the prior art due to the oscillating nature of the load, the motor had to be larger to avoid detrimental heating due to the oscillating nature of the load.

This invention further secures the foregoing advantages and improvements in rotary vacuum filters having relatively coarse filter media such as wire mesh and low-pressure, high volume air sources to effectively remove relatively moist and pliable cake, an application which as previously been generally not greatly successful.

The foregoing bypass and synchronized blow system and method for rotary vacuum filters has been described fully so as to enable a clear understanding of the present invention and to allow its practice. However, it may be that those skilled in the art will foresee changes and modifications in the foregoing description of the present invention without departing from the scope of the invention. Therefore, it is intended by the appended claims to cover all such changes and modifications as fall within the true spirit and scope of the present invention.

The invention claimed is as follows:

1. A rotary vacuum filter of the type having a plurality of filter segments of the drum or the disc type, a continuously rotating face plate with a plurality of circularly positioned ports which are connected through communication passages in a central core member to the filter segments, a stationary blow port in a stationary bridge plate, fixedly mounted in a sliding operative relation to the rotating face plate, such that as the face plate rotates, individual valve ports on the face plate alternately slide past the stationary blow port forming openings of changing size between the face plate and the blow port, and allowing an air stream to be directed from the blow port to the individual valve port, through the communication passages to the filter segment, comprising:

airstream control means for supplying a stream of air from a pressure pumping means directly to the blow port, in a first operative condition of said airstream control means, and, alternatively to the atmosphere in a second operative condition of said airstream control means, and automatic positioning means for automatically positioning the airstream control means in the first operative condition as soon as the rotating face plate has rotated a valve port in position with the blow port, such that a relatively unrestricted opening exists between the blow port and the valve port, said control means and said automatic positioning means, operatively connected in such a manner as to minimize velocity head losses otherwise caused by permitting the airstream to pass through a relatively restricted opening between the blow port and the valve port.

2. The invention as defined in claim 1 wherein the means for automatically positioning the airstream control means in the first operative condition comprises:

synchronizing means for signalling the attainment of the relatively unrestricted opening, and means utilizing the signal from the synchronizing means for actuating the control means to the first operative condition.

3. The invention as defined in claim 2 further comprising means for returning the control means to the second operative condition when the opening between a valve port and the blow part has been closed by the rotation of the rotating face plate.

4. An improvement as recited in claim 2 wherein the synchronizing means includes:

a trip mechanism operatively connected with the central core member to represent the rotational position of at least one valve port in the central core member, and a switch device in operative relation to the trip mechanism for activation by the trip mechanism relative to the attainment of the relatively unrestricted opening between the blow port and the valve port.

5. An improvement as recited in claim 4 wherein the trip mechanism includes a timing pin connected with the central core member in a predetermined relation with each valve port in the central core member.

6. An improvement as recited in claim 4 further including a time delay means for causing the airstream control means to return to the second operative condition a predetermined time after the switch means has been activated by the trip mechanism.

7. An improvement as recited in claim 1 wherein the airstream control means includes an air duct directly connected to the blow port and a first valve in the air duct, the first valve providing an open passage from the air duct to the atmosphere in the second operative condition and a closed passage to the atmosphere in the first operative condition.

8. An improvement as recited in claim 7 further including a second valve in the air duct in series with the blow port and downstream of the first valve, the second valve providing an open passage to the blow port in the first operative condition and a closed passage to the blow port in the second operative condition.

9. An improvement as recited in claim 8 wherein the actuating means further includes a linkage for cooperatively moving the first and second valves to the first and second operative conditions.

10. An improvement as recited in claim 9 further including a branched connection in the air duct and wherein the first valve is connected in another branch of the connection and the second valve is connected in another branch of the connection and in series with the blow port.

11. An improvement as recited in claim 9 wherein the actuating means includes an air plunger device for moving the first and second valves to at least one operative condition.

12. An improvement as recited in claim 1 further including a filtrate blow back trap at a termination point of the communication passage, the termination point being located a distance further down the communication passage from the valve port than the furthermost displaced connection for a filter segment.

13. A method of blowing filter segments in a rotary vacuum filter with a relatively constant, high-volume, low-pressure airstream wherein rotation of the rotary vacuum filter causes a periodic opening and closing of valve ports through which communication with filter segments to be blown is achieved, comprising the steps of:
connecting the airstream directly through a valve port after an initial periodic opening through the valve port occurs and at a time when a relatively unrestricted opening through the valve port occurs, disconnecting the airstream relative to the valve port and,
bypassing the airstream to the atmosphere after blowing the filter segments and before the next succeeding blow of any of the filter segments.

14. A method as recited in claim 13 further including the step of trapping excessive amounts of filtrate blown back at the initiation of each blow.

15. A method as recited in claim 13 further including the step of maintaining the airstream through the valve port for a predetermined time after the airstream is initially switched through the valve port.

16. A method as recited in claim 13 and applicable for use with rotary vacuum filters having a scraper to assist in removing cake discharge from the filter segments, including the further step of arranging the position at which the relatively unrestricted opening through the valve port occurs relative to the scraper to blow the filter segments before those filter segments encounter the scraper.

17. A system for blowing filter segments of a rotary vacuum filter of the type having a plurality of filter segments of the drum or the disc type, a continuously rotating face plate with a plurality of circularly positioned ports which are connected through communication passages in a central core member to the filter segments, a stationary blow port in a stationary bridge plate, fixedly mounted in a sliding operative relation to the rotating face plate, such that as the face plate rotates, individual valve ports on the face plate alternately slide past the stationary blow port forming openings of changing size between the face plate and the blow port, and allowing an air stream to be directed from the blow port to the individual valve port, through the communication passages to the filter segment, comprising:
a source of compressed air;
an air duct directly connecting the air source to the blow port;
a by-pass means in the air duct for automatically conducting the air from the air source to the atmosphere when open and for allowing the air stream from the air source to be conducted to the blow port when closed,
synchronizing means for signaling the occurrence of a relatively unrestricted opening between the blow port and a valve port, and means for causing the by-pass means to assume a closed position upon provision of the signal by the synchronizing means, said by-pass means, said synchronizing means and said means for causing, operatively connected in such a manner as to minimize velocity head losses otherwise caused by permitting the airstream to pass through a relatively restricted opening between the blow port and the valve port.

18. A system as recited in claim 17 further including a filtrate blow back trap at the effective end of each communication channel and downstream of the last filter segment connected in that communication channel.

19. A system as recited in claim 18 wherein the source of air includes a centrifugal blower.

20. A system as recited in claim 18 wherein the synchronizing means includes:
trip means corresponding to the rotational position of the valve ports in the central core member, and
a switch device means connected for activation by the trip means for producing the signal when the relatively unrestricted opening is achieved.

21. A system as recited in claim 18 further including a blocking means in the air duct downstream of the bypass means and operative in conjunction with the bypass means to close the passage in the air duct to the blow port when the bypass means is open and to open the passage in the air duct to the blow port when the bypass means is closed.

22. A system as recited in claim 18 further including means for causing the bypass means to assume an open position a predetermined time after assuming the closed position.

23. The invention as defined in claim 18 and further comprising:
sealing means associated with the filter segments for uniform application of air from the air souce to the filter segments.

* * * * *